United States Patent [19]

Seiler et al.

[11] Patent Number: 4,906,739
[45] Date of Patent: Mar. 6, 1990

[54] FIBRE-REACTIVE AZO DYES CONTAINING A MONOFLUOROROTRIAZINE GROUP

[75] Inventors: Herbert Seiler, Riehen; Gert Hegar, Schönenbuch, both of Switzerland

[73] Assignee: Ciba-Geigy Corporation, Ardsley, N.Y.

[21] Appl. No.: 368,163

[22] Filed: Jun. 15, 1989

Related U.S. Application Data

[63] Continuation of Ser. No. 191,741, May 2, 1988, abandoned, which is a continuation of Ser. No. 63,706, Jun. 15, 1987, abandoned, which is a continuation of Ser. No. 790,271, Nov. 21, 1985, abandoned, which is a continuation of Ser. No. 679,967, Dec. 10, 1984, abandoned, which is a continuation of Ser. No. 107,108, Dec. 26, 1979, abandoned, which is a continuation of Ser. No. 915,343, Jun. 13, 1978, abandoned, which is a continuation of Ser. No. 746,922, Dec. 2, 1976, abandoned.

[30] Foreign Application Priority Data

Dec. 19, 1975 [CH] Switzerland ............. 16500/75

[51] Int. Cl.⁴ .............. C09B 62/04; C09B 62/085; C09B 62/09; D06P 1/382
[52] U.S. Cl. .................... 534/638; 534/637; 534/598; 534/887; 534/583; 534/860; 534/884; 534/843
[58] Field of Search .......................... 534/638

[56] References Cited

U.S. PATENT DOCUMENTS

| | | | |
|---|---|---|---|
| 3,057,846 | 5/1963 | Andrew et al. | 534/638 |
| 3,151,105 | 9/1964 | Andrew et al. | 534/638 |
| 3,170,911 | 2/1965 | Benz et al. | 534/638 |
| 3,438,962 | 4/1969 | Riat et al. | 534/638 |
| 3,711,460 | 1/1973 | Schundehutte | 534/638 X |
| 3,966,705 | 6/1976 | Oesterlein et al. | 534/638 |
| 4,089,895 | 5/1978 | Jager | 534/638 X |

FOREIGN PATENT DOCUMENTS

| | | | |
|---|---|---|---|
| 1188606 | 4/1970 | United Kingdom | 534/638 |
| 1373841 | 11/1974 | United Kingdom | 534/638 |

*Primary Examiner*—Floyd D. Higel
*Attorney, Agent, or Firm*—Edward McC. Roberts

[57] ABSTRACT

A fibre-reactive azo dyestuff of the formula

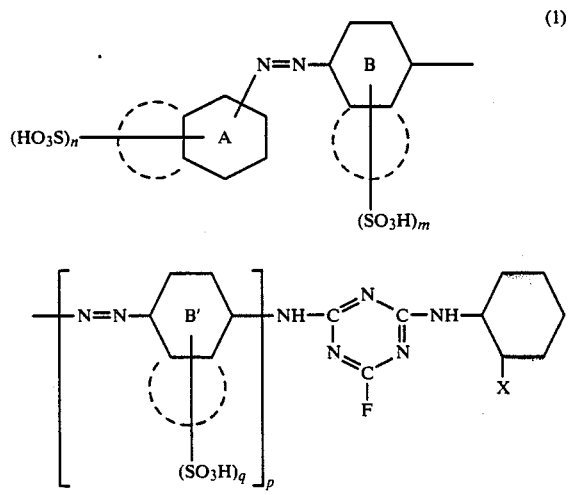

in which X is alkyl or alkoxy with 1 to 4 carbon atoms, carboxyl or halogen, n is 1, 2 or 3, m is 0 or 1, p is 0 or 1 and q is 0 or 1 and the benzene or naphthalene rings A, B and B' can contain further substituents in addition to $SO_3H$ groups. The dyestuffs of the invention are suitable inter alia, for dyeing and printing silk, leather, wool, high molecular weight polyamide fibres and high molecular weight polyurethanes, but especially cellulose-containing materials having a fibrous structure.

4 Claims, No Drawings

FIBRE-REACTIVE AZO DYES CONTAINING A MONOFLUOROROTRIAZINE GROUP

This application is a continuation of application Ser. No. 191,741, filed 5/2/88, now abandoned, which is a continuation of application Ser. No. 063,706 filed June 15, 1987, now abandoned, which is a continuation of application Ser. No. 790,271, filed Nov. 21, 1985, now abandoned, which is a continuation of application Ser. No. 679,967, filed Dec. 10, 1984, now abandoned, which is a continuation of application Ser. No. 107,108, filed Dec. 26, 1979, now abandoned, which is a continuation of application Ser. No. 915,343, filed June 13, 1978, now abandoned, which is a continuation of application Ser. No. 746,922, filed Dec. 2, 1976, now abandoned.

The present invention relates to fibre-reactive azo dyestuffs of the formula

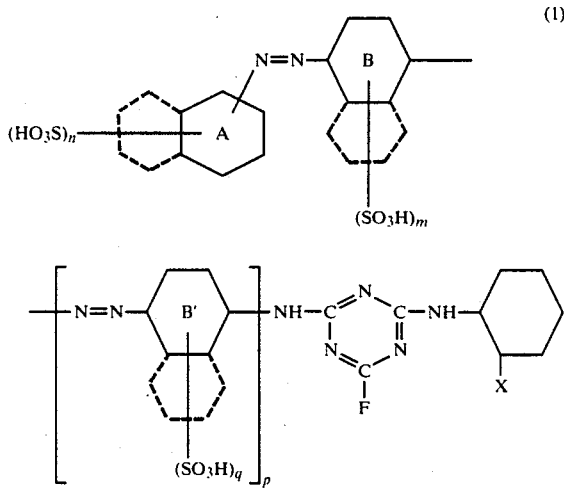

in which X is alkyl or alkoxy with 1 to 4 carbon atoms, carboxyl or halogen, n is 1, 2 or 3, m is 0 or 1, p is 0 or 1 and q is 0 or 1 and the benzene or naphthalene rings A, B and B' can contain further substituents in addition to $SO_3H$ groups.

Possible radicals for X, as alkyl with 1 to 4 carbon atoms, are: methyl, ethyl, propyl, isopropyl, butyl, isobutyl, sec.-butyl and tert.-butyl, and as alkoxy with 1 to 4 carbon atoms are: methoxy, ethoxy, propoxy, isopropoxy, butoxy, isobutoxy, sec.-butoxy and tert.-butoxy, and as halogen are: fluorine, chlorine and bromine.

In addition to $SO_3H$ groups, the benzene or naphthalene rings, A, B and B' contain, as further substituents, for example those which follow: alkyl groups with 1 to 4 carbon atoms, such as methyl, ethyl and propyl, alkoxy groups with 1 to 4 carbon atoms, such as methoxy, ethoxy, propoxy and isopropoxy, acylamino groups with 1 to 6 carbon atoms, such as acetylamino, propionylamino and benzoylamino, amino groups such as —$NH_2$, methylamino and ethylamino, the ureido group, the hydroxyl group and the carboxyl group and halogen, such as fluorine, chlorine and bromine.

Fibre-reactive azo dyestuffs of the formula (1) in which n, m, p, q, A, B and B' have the indicated meanings and X is methyl, methoxy, carboxyl or chlorine are preferred.

Important sub-groups of the fibre-reactive azo dyestuffs of the formula (1) are characterised as follows: (a) A is a naphth-2-yl radical, B is a benzene radical, n is 2 or 3, m is 0 and p is 0, (b) A is a benzene radical, B is a benzene radical, n is 1 or 2, m is 0 and p is 0, (c) A is a naphth-2-yl radical, B is a naphthalene radical, n is 2 or 3, m is 1 and p is 0, (d) A is a benzene radical, B is a benzene radical, B' is a naphthalene radical, n is 1 or 2, m is 0, p is 1 and q is 1, (e) A is a benzene radical, B is a naphthalene radical, B' is a naphthalene radical, n is 1 or 2, m is 1, p is 1 and q is 1 and (f) A is a naphthalene radical, B is a benzene radical, B' is a naphthalene radical, n is 2 or 3, m is 0, p is 1 and q is 1, and in all of the above cases (a) to (f) X is methyl, methoxy, carboxyl or chlorine.

Valuable fibre-reactive azo dyestuffs of the formula (1), sub-group (a), are fibre-reactive azo dyestuffs of the formula

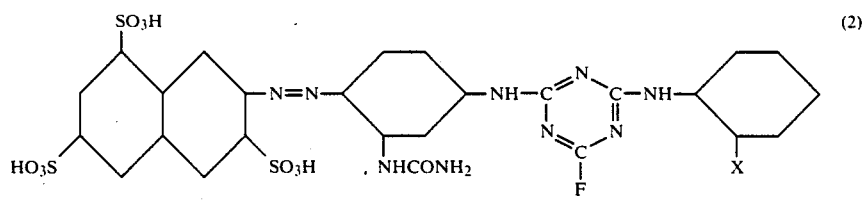

in which X is methyl, methoxy, carboxyl or chlorine.

The fibre-reactive azo dyestuff of the formula (2) in which X is methyl is of particular interest.

The dyestuffs of the formula (1) are fibre-reactive since they contain, in the s-triazine radical, a fluorine atom which can be split off.

Fibre-reactive compounds are to be understood as those which are able to react with the hydroxyl groups in cellulose or with the amino groups in natural or synthetic polyamides with the formation of covalent chemical bonds.

The manufacture of the fibre-reactive azo dyestuffs of the formula (1) is characterised in that an azo compound of the formula

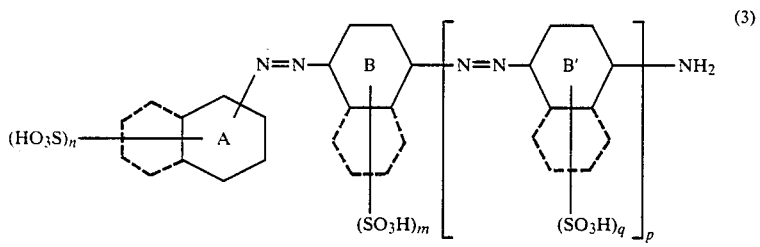

is subjected to a condensation reaction with 2,4,6-trifluoro-1,3,5-triazine of the formula

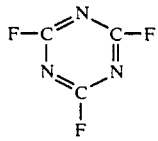

and the resulting primary condensation product is subjected to a condensation reaction with an aminobenzene of the formula

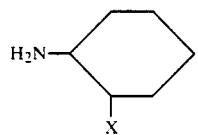

to give a fibre-reactive azo dyestuff of the formula (1).

An aminobenzene of the formula (5) in which X is methyl, methoxy, carboxyl or chlorine is preferably used as the starting material.

In preferred embodiments of the process described above, azo compounds of the formula (3), in which (a) A is a naphth-2-yl radical, B is a benzene radical, n is 2 or 3, m is 0 and p is 0, (b) A is a benzene radical, B is a benzene radical, n is 1 or 2, m is 0 and p is 0, (c) A is a naphth-2-yl radical, B is a naphthalene radical, n is 2 or 3, m is 1 and p is 0, (d) A is a benzene radical, B is a benzene radical, B' is a naphthalene radical, N is 1 or 2, m is 0, p is 1 and q is 1, (e) A is a benzene radical, B is a naphthalene radical, B' is a naphthalene radical, n is 1 or 2, m is 1, p is 1 and q is 1, or (f) A is a naphthalene radical, B is a benzene radical, B' is a naphthalene radical, n is 2 or 3, m is 0, p is 1 and q is 1, and aminobenzenes of the formula (5), in which X is methyl, methoxy, carboxyl or chlorine are used as the starting materials.

The valuable fibre-reactive azo dyestuffs of the formula (2) are obtained by subjecting an azo compound of the formula

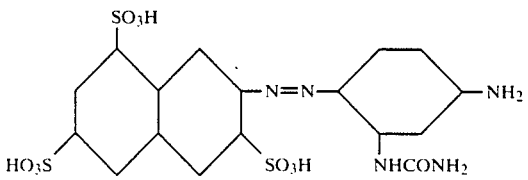

to a condensation reaction with 2,4,6-trifluoro-1,3,5-triazine of the formula (4) and subjecting the resulting primary condensation product to a condensation reaction with an aminobenzene of the formula (5) in which X is methyl, methoxy, carboxyl or chlorine to give a fibre-reactive azo dyestuff of the formula (2).

In particular, an aminobenzene of the formula (5) in which X is methyl is used as the starting material.

The azo compounds of the formula (3) which are used as starting materials for the manufacture of the fibre-reactive azo dyestuffs of the formula (1) are obtained by diazotising aminobenzenesulphonic acids or aminonaphthalenesulphonic acids and coupling the diazo compound with corresponding coupling components of the benzene or naphthalene series which contain a $-NH_2$ group and optionally diazotising the resulting aminoazo compound and again coupling the diazo compound with a second coupling component of the benzene or naphthalene series which contains a $-NH_2$ group.

As a rule, the diazotisation is effected by the action of nitrous acid in aqueous-mineral acid solution at a low temperature and coupling is effected at weakly acid or neutral to weakly alkaline pH values.

The following may be mentioned as diazo components and coupling components which can be used to manufacture the azo compounds of the formula (3):

Diazo components:

1-aminobenzene-2-, -3- and -4-sulphonic acid, 1-aminobenzene-2,4- and -2,5-disulphonic acid, 1-amino-4-methylbenzene-2-sulphonic acid, 1-amino-3-methylbenzene-6-sulphonic acid, 1-amino-6-methylbenzene-3- or -4-sulphonic acid, 1-amino-2,4-dimethylbenzene-6-sulphonic acid, 1-amino-4- or -5-chlorobenzene-2-sulphonic acid, 1-amino-6-chlorobenzene-3- or -4-sulphonic acid, 1-amino-3,4-dichlorobenzene-6-sulphonic acid, 1-amino-2,5-dichlorobenzene-4-sulphonic acid, 1-amino-4-methyl-5-chlorobenzene-2-sulphonic acid 1-amino-5-methyl-4-chlorobenzene-2-sulphonic acid, 1-amino-4- or -5-methoxybenzene-2-sulphonic acid, 1-amino-6-methoxybenzene-3- or -4-sulphonic acid, 1-amino-6-ethoxybenzene-3- or -4-sulphonic acid, 1-amino-2,4-dimethoxybenzene-6-sulphonic acid, 1-amino-2,5-dimethoxybenzene-4-sulphonic acid, 1-amino-3-acetylaminobenzene-6-sulphonic acid, 1-amino-4-acetylaminobenzene-2-sulphonic acid, 1-amino-3-acetylamino-4-methylbenzene-6-sulphonic acid, 1-aminonaphthalene-2-, -4-, -5-, -6-, -7- or -8-sulphonic acid, 2-aminonaphthalene-1-, -5- or -6-sulphonic acid, 1-aminonaphthalene-3,6- or -5,7-disulphonic acid, 2-aminonaphthalene-1,5-, -1,7-, -3,6-, -5,7-, -4,8- or -6,8-disulphonic acid, 1-aminonaphthalene-2,5,7-trisulphonic acid and 2-aminonaphthalene-1,5,7-, -3,6,8- or -4,6,8-trisulphonic acid.

Coupling components:

Aminobenzene, N-methyl-, -ethyl- or -butyl-aminobenzene, 1-amino-2- or -3-methylbenzene, 1-methylamino-3-methylbenzene, 1-ethylamino-3-methylbenzene, 1-amino-2,5-dimethylbenzene, 1-amino-2,5-diethylbenzene, 1-amino-2- or -3-methoxybenzene, 1- amino-2- or -3-ethoxybenzene, 1-amino-2,5-dimethoxybenzene, 1-amino-2,5-diethoxybenzene, 1-amino-3-acetylaminobenzene, 1-amino-3-ureidobenzene, 1-amino-3-hydroxyacetylaminobenzene, 1-amino-3-sulphoacetylaminobenzene, 1-amino-3-methyl-6-methoxybenzene, 1-amino-3-acetylamino-6-methylbenzene, 1-amino-3-acetylamino-6-methoxybenzene, 1-amino-3-ureido-6-methylbenzene, 1-amino-2-methoxy-5-methylbenzene, 1-aminonaphthalene, 1-aminonaphthalene-6-, -7- or -8-sulphonic acid and 1-amino-2-methoxynaphthalene-6-sulphonic acid.

Further compounds which may be mentioned as starting materials for the manufacture of the fibre-reactive azo dyestuffs of the formula (1) are: 2,4,6-trifluoro-1,3,5-triazine (cyanuric fluoride) of the formula (4) and aminobenzenes of the formula (5), such as 1-amino-2-methyl-, -ethyl- or -propylbenzene, 1-amino-2-methoxy- or -ethoxy-benzene, 1-amino-2-carboxybenzene, 1-amino-2-chlorobenzene, 1-amino-2-bromobenzene and 1-amino-2-fluorobenzene.

The condensation reactions of 2,4,6-trifluoro-1,3,5-triazine with the azo compounds of the formula (3) and the aminobenzenes of the formula (5) are preferably carried out in aqueous solution or suspension, at a low temperature and at a weakly acid or neutral to weakly alkaline pH value. Advantageously, the hydrogen fluoride liberated during the condensation reaction is continuously neutralized by adding aqueous alkali metal hydroxides, alkali metal carbonates or alkali metal bicarbonates.

The fibre-reactive azo dyestuffs of the formula (1) are

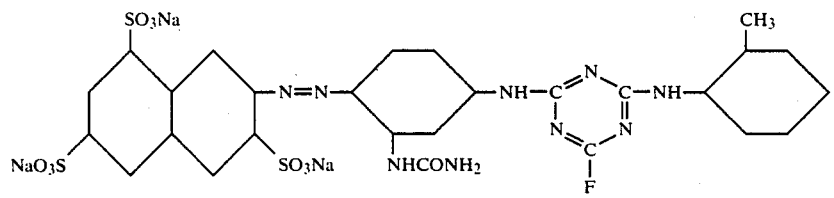

distinguished by a high reactivity and a high degree of fixation.

They are suitable for dyeing and printing very diverse materials, such as silk, leather, wool, high molecular weight polyamide fibres and high molecular weight polyurethanes, but especially cellulose-containing materials having a fibrous structure, such as linen, cellulose, regenerated cellulose and, above all, cotton. They are suitable both for the exhaustion process and for dyeing by the pad dyeing process, according to which the goods are impregnated with aqueous and, optionally, also salt-containing dyestuff solutions and the dyestuffs are fixed after an alkali treatment, or in the presence of alkali, optionally with the action of heat.

They are also suitable for printing, especially on cotton, but likewise also for printing nitrogen-containing fibres such as, for example, wool, silk or mixed fabrics containing wool.

It is advisable to subject the dyeings and prints to thorough rinsing with cold and hot water, optionally with the addition of an agent which has a dispersing action and promotes diffusion of amounts which have not been fixed.

In the examples which follow, the parts denote parts by weight and the temperatures are given in degrees centigrade.

EXAMPLE 61.1 parts of the aminoazo dyestuff of the formula

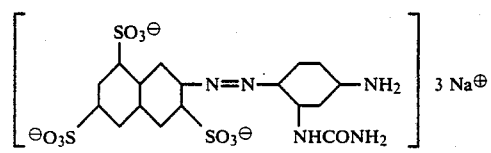

are dissolved in 500 parts of water. 14 parts of 2,4,6-trifluoro-1,3,5-triazine are added dropwise in the course of 15 minutes at a temperature of 0°, a pH value of about 6 being maintained by adding 2N sodium hydroxide solution at the same time. 10.7 parts of 1-amino-2-methylbenzene are added all at once to the resulting solution, in which no further starting material can be detected, and the temperature is allowed to rise to 20°. The acid liberated during the condensation reaction is neutralised by continuously adding sodium hydroxide solution at such a rate that a pH value of 7 to 8 is maintained. After the reaction hs ended, the dyestuff of the formula is precipitated by sprinkling in sodium chloride, filtered off and, after the addition of a phosphate buffer, dried. After grinding, this gives an orange dyestuff powder with which cotton is dyed from an aqueous bath in fast reddish-tinged yellow shades.

The dyestuff can also be isolated by evaporating or spray-drying the entire reaction mixture.

If equivalent amounts of 1-amino-2-chlorobenzene, 1-amino-2-methoxybenzene or 1-amino-2-carboxybenzene are used in place of 1-amino-2-methylbenzene, dyestuffs with similar dyeing properties are obtained.

If equivalent amounts of the aminoazo dyestuffs listed in the table which follows are used in place of the indicated aminoazo dyestuff, further valuable dyestuffs, which on cotton give dyeings of the indicated shade, are obtained in accordance with the instructions in the example.

| | Aminoazo dyestuff obtained from | | Colour shade |
|---|---|---|---|
| No. | Diazo component | Coupling component | on cotton |
| 1 | 1-aminobenzene-2,5-disulphonic acid | 1-amino-3-acetylaminobenzene | yellow |
| 2 | 2-aminonaphthalene-4,8-disulphonic acid | 1-amino-3-methylbenzene | yellow |
| 3 | 2-aminonaphthalene-5,7-disulphonic acid | 1-amino-3-ureidobenzene | reddish-tinged yellow |

-continued

| No. | Aminoazo dyestuff obtained from Diazo component | Coupling component | Colour shade on cotton |
|---|---|---|---|
| 4 | 2-aminonaphthalene-5,7-disulphonic acid | 1-amino-3-acetylaminobenzene | reddish-tinged yellow |
| 5 | 2-aminonaphthalene-4,8-disulphonic acid | 1-amino-3-acetylaminobenzene | reddish-tinged yellow |
| 6 | 2-aminonaphthalene-4,6,8-trisulphonic acid | 1-amino-3-acetylaminobenzene | reddish-tinged yellow |
| 7 | 2-aminonaphthalene-4,6,8-trisulphonic acid | 1-amino-2-methoxy-5-methylbenzene | reddish-tinged yellow |
| 8 | 2-aminonaphthalene-4,6,8-trisulphonic acid | 1-amino-2,5-dimethylbenzene | yellow |
| 9 | 2-aminonaphthalene-4,6,8-trisulphonic acid | 1-aminonaphthalene-6-sulphonic acid | reddish-tinged yellow |
| 10 | 2-aminonaphthalene-3,6,8-trisulphonic acid | 1-amino-3-ureido-6-methylbenzene | reddish-tinged yellow |
| 11 | 2-aminonaphthalene-6,8-disulphonic acid | 1-amino-3-ureidobenzene | reddish-tinged yellow |
| 12 | 2-aminonaphthalene-4,6,8-trisulphonic acid | 1-aminobenzene | yellow |
| 13 | 1-amino-2,5-dimethyl-4-(2',5'-disulphophenylazo)-benzene | 1-aminonaphthalene-8-sulphonic acid | orange |
| 14 | 1-amino-4-(2',5'-disulphophenylazo)-naphthalene-6-sulphonic acid | 1-aminonaphthalene-7-sulphonic acid | orange |
| 15 | 1-amino-2,5-dimethyl-4-(2',5',7'-trisulphonaphth-1'-ylazo)-benzene | 1-aminonaphthalene-6-sulphonic acid | brown |
| 16 | 1-amino-2,5-dimethyl-4-(2',5',7'-trisulphonaphth-1'-ylazo)-benzene | 1-aminonaphthalene-7-sulphonic acid | brown |
| 17 | 1-amino-2,5-dimethoxy-4-(2',5'7'-trisulphonaphth-1'-ylazo)-benzene | 1-aminonaphthalene-6-sulphonic acid | brown |
| 18 | 1-amino-3-methyl-4-(4',8'-disulphonaphth-2'-ylazo)-benzene | 1-amino-3-methylbenzene | brownish-tinged orange |
| 19 | 1-amino-4-(4',6',8'-trisulphonaphth-2'-ylazo)-benzene | aminobenzene | orange |
| 20 | 1-amino-4-(2',5'-disulphophenylazo)-naphthalene-6-sulphonic acid | 1-aminonaphthalene-8-sulphonic acid | brown |
| 21 | 1-amino-4-(2',5'-disulphophenylazo)-naphthalene-6/7-sulphonic acid (mixture) | 1-aminonaphthalene-8-sulphonic acid | brown |
| 22 | 4-aminoazobenzene-3,4'-disulphonic acid | 1-aminonaphthalene-6-sulphonic acid | brown |

If 2,4,6-trifluoro-1,3,5-triazine is subjected to a condensation reaction, analogously to the instructions in the example, with the aminoazo compounds and aminobenzenes listed in the table which follows, further fibre-reactive azo dyestuffs of the formula (1), which dye cotton in yellow to brown shades, are obtained.

| Aminoazo compound obtained from Diazo component | Coupling component | Aminobenzene |
|---|---|---|
| 2-aminonaphthalene-4,8-disulphonic acid | 1-amino-2-methoxy-5-methylbenzene | 1-amino-2-methylbenzene |
| 2-aminonaphthalene-4,8-disulphonic acid | " | 1-amino-2-carboxybenzene |
| 1-aminonaphthalene-3,6-disulphonic acid | 1-amino-3-methylbenzene | 1-amino-2-methylbenzene |
| 1-aminonaphthalene-3,6-disulphonic acid | " | 1-amino-2-chlorobenzene |
| 2-aminonaphthalene-5,7-disulphonic acid | " | 1-amino-2-methylbenzene |
| 2-aminonaphthalene-5,7-disulphonic acid | " | 1-amino-2-ethylbenzene |
| 2-aminonaphthalene-6,8-disulphonic acid | " | 1-amino-2-methylbenzene |
| 2-aminonaphthalene-6,8-disulphonic acid | " | 1-amino-2-methoxybenzene |
| 4-aminoazobenzene-3,4'-disulphonic acid | " | 1-amino-2-bromobenzene |
| 1-aminobenzene-4-sulphonic acid → 1-aminonaphthalene-6-sulphonic acid | " | 1-amino-2-methylbenzene |

-continued

| Aminoazo compound obtained from | | |
|---|---|---|
| Diazo component | Coupling component | Aminobenzene |
| 2-aminonaphthalene-4,8-disulphonic acid | 1-amino-3-methoxybenzene | " |
| 2-aminonaphthalene-4,8-disulphonic acid | 1-amino-3-acetylaminobenzene | 1-amino-2-chlorobenzene |
| 2-aminonaphthalene-4,8-disulphonic acid | aminobenzene | " |
| 2-aminonaphthalene-1,5-disulphonic acid | 1-amino-3-methyl-6-methoxybenzene | 1-amino-2-methylbenzene |
| 2-aminonaphthalene-1,5-disulphonic acid | 1-amino-3-methylbenzene | " |
| 2-aminonaphthalene-1,5-disulphonic acid | 1-aminonaphthalene-6-sulphonic acid | 1-amino-2-chlorobenzene |
| 2-aminonaphthalene-1,5-disulphonic acid | 1-amino-3-acetylaminobenzene | 1-amino-2-methoxybenzene |
| 2-aminonaphthalene-1,5-disulphonic acid | 3-aminophenylurea | " |
| 2-aminonaphthalene-1,5-disulphonic acid | 1-amino-3-hydroxyacetylaminobenzene | " |
| 2-aminonaphthalene-5,7-disulphonic acid | 1-amino-3-methyl-6-methoxybenzene | 1-amino-2-chlorobenzene |
| 2-aminonaphthalene-5,7-disulphonic acid | 1-aminonaphthalene-7-sulphonic acid | " |
| 2-aminonaphthalene-5,7-disulphonic acid | 1-amino-3-acetylaminobenzene | " |
| 2-aminonaphthalene-5,7-disulphonic acid | 3-aminophenylurea | " |
| 2-aminonaphthalene-5,7-disulphonic acid | 1-amino-3-hydroxyacetylaminobenzene | 1-amino-2-chlorobenzene |
| 1-aminonaphthalene-3,7-disulphonic acid | 1-amino-3-methyl-6-methoxybenzene | 1-amino-2-methylbenzene |
| 1-aminonaphthalene-3,7-disulphonic acid | 1-amino-3-methylbenzene | " |
| 1-aminonaphthalene-3,7-disulphonic acid | 1-aminonaphthalene-6-sulphonic acid | " |
| 2-aminonaphthalene-3,6-disulphonic acid | 1-amino-3-methylbenzene | " |
| 2-aminonaphthalene-3,6-disulphonic acid | 1-amino-3-methyl-6-methoxybenzene | " |
| 2-aminonaphthalene-3,6-disulphonic acid | 1-amino-3-acetylaminobenzene | 1-amino-2-methylbenzene |
| 2-aminonaphthalene-3,6-disulphonic acid | 3-aminophenylurea | " |
| 2-aminonaphthalene-3,6-disulphonic acid | 1-amino-3-hydroxyacetylaminobenzene | " |
| 2-aminonaphthalene-3,6-disulphonic acid | 1-aminonaphthalene-6-sulphonic acid | " |
| 2-aminonaphthalene-6,8-disulphonic acid | 1-amino-3-acetylaminobenzene | " |
| 2-aminonaphthalene-6,8-disulphonic acid | 1-amino-2-methoxynaphthalene-6-sulphonic acid | 1-amino-2-methylbenzene |
| 2-aminonaphthalene-6,8-disulphonic acid | 1-aminonaphthalene-6-sulphonic acid | " |
| 2-aminonaphthalene-4,8-disulphonic acid | " | " |
| 2-aminonaphthalene-4,8-disulphonic acid | 1-aminonaphthalene-7-sulphonic acid | " |
| 2-aminonaphthalene-4,8-disulphonic acid | 1-amino-2-methoxynaphthalene-6-sulphonic acid | " |
| 2-aminonaphthalene-4,8-disulphonic acid | aminobenzene | " |
| 2-aminonaphthalene-4,8-disulphonic acid | 1-amino-3-ethylbenzene | " |
| 2-aminonaphthalene-4,8-disulphonic acid | aminobenzene | 1-amino-2-carboxybenzene |
| 2-aminonaphthalene-4,8-disulphonic acid | 1-amino-2,5-dimethylbenzene | 1-amino-2-bromobenzene |
| 2-aminonaphthalene-4,8-disulphonic acid | 1-amino-3-sulphoacetylaminobenzene | 1-amino-2-fluorobenzene |
| 2-aminonaphthalene-4,8-disulphonic acid | 1-methylamino-3-methylbenzene | 1-amino-2-ethylbenzene |
| 2-aminonaphthalene-3,6,8-trisulphonic acid | aminobenzene | 1-amino-2-methylbenzene |
| 2-aminonaphthalene-3,6,8-trisulphonic acid | 1-amino-3-methylbenzene | 1-amino-2-methylbenzene |
| 2-aminonaphthalene-3,6,8-trisulphonic acid | 3-aminophenylurea | 1-amino-2-methoxybenzene |
| 2-aminonaphthalene-3,6,8-trisulphonic acid | 1-amino-3-hydroxyacetylaminobenzene | " |
| 2-aminonaphthalene-3,6,8-trisulphonic acid | 1-amino-3-acetylamino-6-methoxybenzene | 1-amino-2-methylbenzene |

-continued

| Aminoazo compound obtained from | | |
|---|---|---|
| Diazo component | Coupling component | Aminobenzene |
| 2-aminonaphthalene-3,6,8-trisulphonic acid | 1-amino-3-acetylamino-6-methyl-benzene | " |
| 2-aminonaphthalene-3,6,8-trisulphonic acid | 1-amino-3-methanesulphonylamino-benzene | 1-amino-2-propylbenzene |
| 2-aminonaphthalene-3,6,8-trisulphonic acid | 1-amino-2,5-dimethoxybenzene | 1-amino-2-methylbenzene |
| 2-aminonaphthalene-3,6,8-trisulphonic acid | 1-amino-3-methyl-6-methoxybenzene | " |
| 2-aminonaphthalene-3,6,8-trisulphonic acid | aminobenzene | 1-amino-2-chlorobenzene |
| 2-aminonaphthalene-3,6,8-trisulphonic acid | " | 1-amino-2-bromobenzene |
| 2-aminonaphthalene-3,6,8-trisulphonic acid | N—ethylaniline | 1-amino-2-methoxybenzene |
| 2-aminonaphthalene-3,6,8-trisulphonic acid | 1-amino-3-acetylamino-6-methyl-benzene | 1-amino-2-fluorobenzene |
| 2-aminonaphthalene-3,6,8-trisulphonic acid | 1-ethylamino-3-methylbenzene | 1-amino-2-butylbenzene |
| 2-aminonaphthalene-3,6,8-trisulphonic acid | 1-amino-2-methylbenzene | 1-amino-2-methylbenzene |
| 2-aminonaphthalene-3,6,8-trisulphonic acid | 1-amino-2,5-dimethylbenzene | " |
| 2-aminonaphthalene-3,6,8-trisulphonic acid | 1-amino-2-methoxybenzene | " |
| 2-aminonaphthalene-3,6,8-trisulphonic acid | 1-amino-3-methoxybenzene | " |
| 2-aminonaphthalene-3,6,8-trisulphonic acid | 1-amino-3-methoxybenzene | 1-amino-2-methoxybenzene |
| 2-aminonaphthalene-3,6,8-trisulphonic acid | 1-aminonaphthalene-6-sulphonic acid | 1-amino-2-methylbenzene |
| 2-aminonaphthalene-3,6,8-trisulphonic acid | 1-aminonaphthalene-7-sulphonic acid | " |
| 2-aminonaphthalene-4,6,8-trisulphonic acid | 1-amino-3-methylbenzene | " |
| 2-aminonaphthalene-4,6,8-trisulphonic acid | aminobenzene | 1-amino-2-chlorobenzene |
| 2-aminonaphthalene-4,6,8-trisulphonic acid | " | 1-amino-2-methoxybenzene |
| 2-aminonaphthalene-4,6,8-trisulphonic acid | 1-amino-3-acetylaminobenzene | " |
| 1-aminonaphthalene-2,5,7-trisulphonic acid | 1-amino-3-methylbenzene | 1-amino-2-methylbenzene |
| 1-aminonaphthalene-2,5,7-trisulphonic acid | 1-aminonaphthalene-6-sulphonic acid | " |
| 1-aminonaphthalene-2,5,7-trisulphonic acid | 1-amino-3-acetylaminobenzene | " |
| 1-aminonaphthalene-2,5,7-trisulphonic acid | 3-aminophenylurea | " |
| 1-aminonaphthalene-2,5,7-trisulphonic acid | 1-amino-3-hydroxyacetylaminobenzene | 1-amino-2-carboxybenzene |
| 1-aminonaphthalene-2,5,7-trisulphonic acid | aminobenzene | 1-amino-2-methylbenzene |
| 1-aminonaphthalene-2,5,7-trisulphonic acid | " | 1-amino-2-ethoxybenzene |
| 1-aminonaphthalene-2,5,7-trisulphonic acid | " | 1-amino-2-propoxybenzene |
| 1-aminonaphthalene-2,5,7-trisulphonic acid | " | 1-amino-2-carboxybenzene |
| 1-aminonaphthalene-2,5,7-trisulphonic acid | 1-amino-3-methylbenzene | 1-amino-2-chlorobenzene |
| aniline-2,5-disulphonic acid | 1-aminonaphthalene-6-sulphonic acid | 1-amino-2-methylbenzene |
| aniline-2,5-disulphonic acid | 1-aminonaphthalene-7-sulphonic acid | " |
| aniline-2,5-disulphonic acid | 1-amino-3-methylbenzene | 1-amino-2-methylbenzene |
| aniline-2,5-disulphonic acid | 1-amino-3-acetylaminobenzene | 1-amino-2-methoxybenzene |
| aniline-2,5-disulphonic acid | 1-amino-2-methoxy-5-methylbenzene | 1-amino-2-chlorobenzene |
| aniline-2,5-disulphonic acid | 1-amino-2,5-dimethoxybenzene | " |
| aniline-2,4-disulphonic acid | 1-amino-2-methoxy-5-methylbenzene | 1-amino-2-methylbenzene |

Dyeing Instructions I 2 parts of the dyestuff obtained according to the example are dissolved in 100 parts of water with the addition of 0.5 part of sodium m-nitrobenzene sulphonate. A cotton fabric is impregnated with the resulting solution so that its weight increases by 75% and is then dried.

The fabric is then impregnated with a solution which is at 20° and contains 5 grams of sodium hydroxide and 300 grams of sodium chloride per liter and squeezed off to an increase in weight of 75% and the dyeing is steamed for 30 seconds at 100° to 101°, rinsed, soaped for a quarter of an hour in a 0.3% strength boiling solution of a non-ionic washing agent, rinsed and dried.

Dyeing Instructions II 2 parts of the dyestuff obtainable according to the example are dissolved in 100 parts of water.

The solution is added to 1,900 parts of cold water, 60 parts of sodium chloride are added and 100 parts of a cotton fabric are introduced into this dyebath.

The temperature is raised to 40° and after 30 minutes 40 parts of calcined sodium carbonate and a further 60 parts of sodium chloride are added. The temperature is kept at 40° for 30 minutes, the fabric is rinsed and the dyeing is then soaped for 15 minutes in a 0.3% strength boiling solution of a non-ionic washing agent, rinsed and dried.

What is claimed is:

1. A fibre-reactive azo dyestuff of the formula

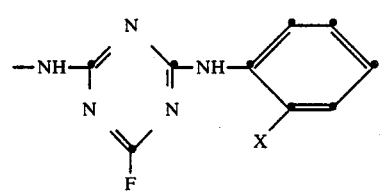

in which
n is 2 or 3, and the benzene ring B is unsubstituted or substituted by alkyl of 1 to 4 carbon atoms, alkoxy of 1 to 4 carbon atoms, alkanoylamino of up to 6 carbon atoms, benzoylamino,
$NH_2$, methylamino, ethylamino, ureido, hydroxy, carboxy or halogen and
X is methyl, methoxy, carboxyl or chlorine.

2. A fibre-reactive azo dyestuff according to claim 1 of the formula

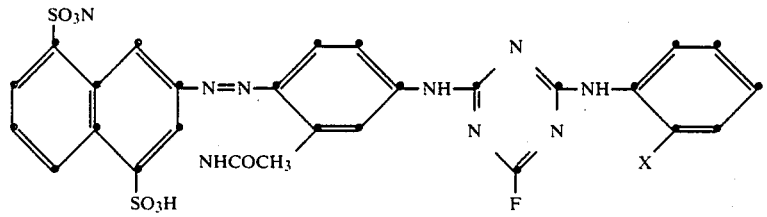

wherein
X is methyl, methoxy, carboxyl or chlorine.

3. A fibre-reactive azo dyestuff according to claim 1, of the formula

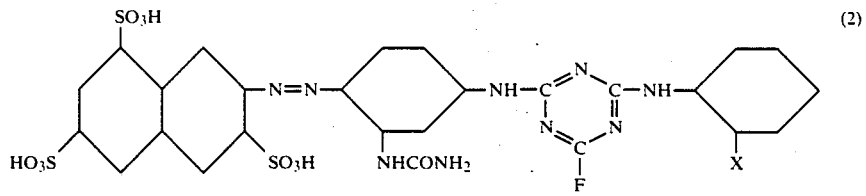

(2)

in which X is methyl, methoxy, carboxyl or chlorine.

4. The fibre-reactive azo dyestuff according to claim 3, in which X is methyl.

* * * * *